United States Patent [19]

Lotocky et al.

[11] Patent Number: 5,848,367
[45] Date of Patent: *Dec. 8, 1998

[54] SYSTEM AND METHOD FOR SHARING A NON-VOLATILE MEMORY ELEMENT AS A BOOT DEVICE

[75] Inventors: Daniel A. Lotocky, Fullerton; Michael R. Atkinson, Irvine; Troy D. Batterberry, Hermosa Beach, all of Calif.

[73] Assignees: Sony Corporation, Tokyo, Japan; Sony Trans Com, Inc., Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 713,874

[22] Filed: Sep. 13, 1996

[51] Int. Cl.$^6$ .............................. G05B 15/00; H04N 7/14
[52] U.S. Cl. ..................... 701/36; 348/12; 395/200.42; 395/728
[58] Field of Search ............................. 701/33, 36, 49; 364/131–134; 348/13, 6, 7, 12; 395/728, 729, 200.3, 200.38, 200.42, 200.43, 200.47, 200.5, 200.52, 200.83

[56] References Cited

U.S. PATENT DOCUMENTS

| | | | |
|---|---|---|---|
| 3,795,771 | 3/1974 | Gunderson et al. | 179/15 |
| 4,352,200 | 9/1982 | Oxman | 455/41 |
| 4,428,078 | 1/1984 | Kuo | 455/3 |
| 4,584,603 | 4/1986 | Harrison | 358/86 |
| 4,647,980 | 3/1987 | Steventon et al. | 358/254 |
| 4,763,360 | 8/1988 | Daniels et al. | 455/3 |
| 4,774,514 | 9/1988 | Hildebrandt et al. | 340/971 |
| 4,835,604 | 5/1989 | Kondo et al. | 358/86 |

(List continued on next page.)

OTHER PUBLICATIONS

"Optibase & BEA Make MPEG Fly!", Unlisted, *Digital Video News* Jul. 1995.
"Video–On–Demand Trail Starts on Alitalia Airlines Other Airplane Tests Have Same Maddening Delays as Cable/Telco Trials", Unlisted, *European Media Business & Finance* Nov. 3, 1995.

(List continued on next page.)

*Primary Examiner*—Michael Zanelli
*Assistant Examiner*—Edward J. Pipala
*Attorney, Agent, or Firm*—Blakely, Sokoloff, Taylor & Zafman LLP

[57] ABSTRACT

A system and method for multiple processors operating independently from one another to share memory as a boot device. The system includes a plurality of computing systems each including a processor and a local memory element. In response to a boot condition for a selected computing system, its processor begins a boot sequence in which it uses operational code contained within a non-volatile memory element that is shared by each of the computing systems. Arbitration for ownership of a memory bus interconnecting the non-volatile memory element to the processors and organization of a direct memory access transfer between the non-volatile memory element and local memory associated with the processor of the selected computing system is controlled by a memory access coordination circuit coupled between the computing systems and the memory bus.

25 Claims, 8 Drawing Sheets

U.S. PATENT DOCUMENTS

| | | |
|---|---|---|
| 4,866,515 | 9/1989 | Tagawa et al. ............................ 348/8 |
| 4,896,209 | 1/1990 | Matsuzaki et al. ...................... 358/86 |
| 4,897,714 | 1/1990 | Ichise et al. ............................. 358/86 |
| 4,920,432 | 4/1990 | Eggers et al. .......................... 360/33.1 |
| 4,975,696 | 12/1990 | Salter, Jr. et al. ..................... 340/973 |
| 5,123,015 | 6/1992 | Brady, Jr. et al. ....................... 70/112 |
| 5,214,505 | 5/1993 | Rabowsky et al. ......................... 358/8 |
| 5,220,419 | 6/1993 | Sklar et al. .............................. 358/86 |
| 5,289,272 | 2/1994 | Rabowsky et al. ...................... 358/86 |
| 5,311,302 | 5/1994 | Berry et al. ............................... 379/14 |
| 5,347,632 | 9/1994 | Filepp et al. ............................ 395/200 |
| 5,404,567 | 4/1995 | DePietro et al. ........................ 455/6.3 |
| 5,414,455 | 5/1995 | Hooper et al. .............................. 348/7 |
| 5,442,390 | 8/1995 | Hooper et al. .............................. 348/7 |
| 5,529,265 | 6/1996 | Sakurai .................................... 244/118 |
| 5,539,448 | 7/1996 | Verhille et al. ............................ 348/6 |
| 5,555,466 | 9/1996 | Scribner et al. ........................... 348/8 |
| 5,557,541 | 9/1996 | Schulhof et al. ...................... 364/514 |
| 5,568,180 | 10/1996 | Okamoto .................................... 348/7 |
| 5,568,181 | 10/1996 | Greenwood et al. ....................... 348/7 |
| 5,568,484 | 10/1996 | Margis .................................... 370/85.5 |
| 5,568,614 | 10/1996 | Mendelson et al. ............... 395/200.61 |
| 5,572,442 | 11/1996 | Schulhof et al. ....................... 455/4.2 |
| 5,581,270 | 12/1996 | Smith et al. ................................ 345/2 |
| 5,586,121 | 12/1996 | Moura et al. ........................... 370/404 |
| 5,586,937 | 12/1996 | Menashe .................................... 463/41 |
| 5,596,647 | 1/1997 | Wakai et al. .............................. 381/77 |
| 5,608,447 | 3/1997 | Farry et al. ................................. 348/7 |
| 5,608,448 | 3/1997 | Smoral et al. ............................. 348/7 |
| 5,610,822 | 3/1997 | Murphy .................................. 701/211 |
| 5,612,730 | 3/1997 | Lewis ........................................ 348/12 |
| 5,628,027 | 5/1997 | Belmont .................................. 395/821 |
| 5,631,693 | 5/1997 | Wunderlich et al. ....................... 348/7 |
| 5,634,012 | 5/1997 | Stefik et al. ............................ 395/239 |

OTHER PUBLICATIONS

"BE Aerospace Interactive Video System Successfully Debuts on British Airways B747; Company Awarded $33 Million in New Seating Programs" Unlisted, *Business Wire* Nov. 21, 1995.

"TNCi Continues Airview(TM) Enhancement with Telephone Interface", Unlisted, *PR Newswire* Nov. 28, 1995.

"First Totally Digitalized In–Flight Entertainment System to be Introduced on International Carrier—Alitalia; IFT System will Debut on Rome to Chicago Flight Dec. 1st", Unlisted, *Business Wire* Nov. 30, 1995.

"TNC to Put Internet Service into its IFE", Unlisted, *In–Flight Entertainment* Jan. 1996.

"Interactive Flight Technologies Signs Agreement with Swissair; IFT to Install In–Flight Entertainment System, Complete with Casino–Style Gambling, On All 21 of its Long–Haul Jets", Unlisted, *Business Wire* May 2, 1996.

The Network Connection Announces Hiper Cheetah—300 Simultaneous Video Streams, Unlisted, *PR Newswire* Jun. 7, 1996.

"Two–Way Street" *Inflight*, Harbison & Dunn, P14–18 (Mar. 1996).

"Airframers Force Disipline in High–Stakes IFE Market" *Aerospace Business*, Velocci, P41–43 (Mar. 25, 1996).

"MDDS Is Here!" *Digital Video News* P1 (Jul. 1995).

"Flying Those Interactive Skies" *TV Technology*, Morris (Oct. 1995).

SYSTEM AND METHOD FOR SHARING A NON-VOLATILE MEMORY ELEMENT AS A BOOT DEVICE

BACKGROUND OF THE INVENTION

1. Field of the Invention

The present invention relates to the field of electronics. More particularly, the present invention relates to a system and method for sharing a memory element as a boot device for multiple computing systems.

2. Description of Art Related to the Invention

Recently, commercial aircraft manufacturers have begun to implement individual passenger in-flight entertainment ("IFE") systems within commercial aircraft. The IFE systems are controlled by a number of computers, each of which includes a central processing unit dedicated to control telephony and entertainment services for the group of passenger seats. Upon power up, the CPU of the computer will execute a boot sequence by fetching operational code residing in BIOS. The BIOS, normally machine code typically stored in read only memory ("ROM"), allows the CPU to perform various tasks such as hardware initialization. The CPU further instructs software drivers of the BIOS to locate where an operating system kernel is contained, generally within mass storage (e.g., a hard disk), and load its address into Random Access Memory ("RAM"). Thereafter, the CPU continues execution of the operating system kernel and related code loaded in the RAM 28.

Currently, IFE manufacturers have been requested to provide additional features to the IFE systems. One desired feature includes the ability of each passenger to select playback of featured movies or video programs upon selection by the passenger. This feature is actual "video on demand," as opposed to playback starting at particular time intervals not within control of each individual passenger. This feature, of course, would require the IFE system to possess greater processing capabilities.

Due to the necessity for greater processing capability, it is generally required that more CPUs are implemented within the IFE system. In the event that a decentralized topology is used in which a computer is assigned to process information associated with a unique passenger seat, a greater amount of storage memory would be required to contain operating system code and BIOS for each of these CPUs. This additional storage memory would greatly increase not only the total cost of the IFE system, which employs hundreds of computers, but also the amount of power required to support the IFE system. The additional storage memory would also reduce the amount of space available in the cabin and would increase the total weight of the commercial aircraft being, of course, detrimental to fuel economy of the aircraft. However, if a centralized topology is used, the load placed on the BIOS would reduce the performance of the network to be substantially below its optimal level.

Therefore, it would be advantageous to develop a system and method for sharing a memory element as a boot device in order to overcome the above-identified disadvantages.

SUMMARY OF THE INVENTION

The present invention relates to a system and method for sharing a common non-volatile storage element as a boot device for multiple computing systems. The system includes a plurality of computing systems each including a processor and a local memory element. In response to a boot condition for a selected computing system, its processor begins a boot sequence in which it uses operational code contained within a non-volatile memory element that is shared by each of the computing systems. Arbitration for ownership of a memory bus interconnecting the non-volatile memory element to the processors and organization of a direct memory access transfer between the non-volatile memory element and local memory associated with the processor of the selected computing system is controlled by a memory access coordination circuit coupled between the computing systems and the memory bus.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates to a system and method for sharing a memory element as a boot device for multiple computing systems, the system preferably being implemented within a vehicle. Throughout the detailed description, a number of illustrative embodiments are described in order to convey the spirit and scope of the present invention. While numerous specific details are set forth to describe the preferred embodiment of the invention, such details may not be required to practice the present invention.

Moreover, a number of terms are frequently used to describe certain circuitry utilized by the present invention when implemented within a vehicle. A "vehicle" may include, but is not limited to, an aircraft, train, ferry, bus or any other mode of mass transit. For clarity sake, herein, the present invention will be described during implementation within commercial aircraft. A "passenger control unit"

(PCU) and a "passenger control handset" (PCH) are circuitry preferably implemented in an armrest of a passenger seat. This circuitry operates in combination with other circuitry on-board the aircraft in order to support passenger services (e.g., activating or deactivating a reading light, calling a flight attendant, etc.) as well as telephony and video display.

Figure 1:
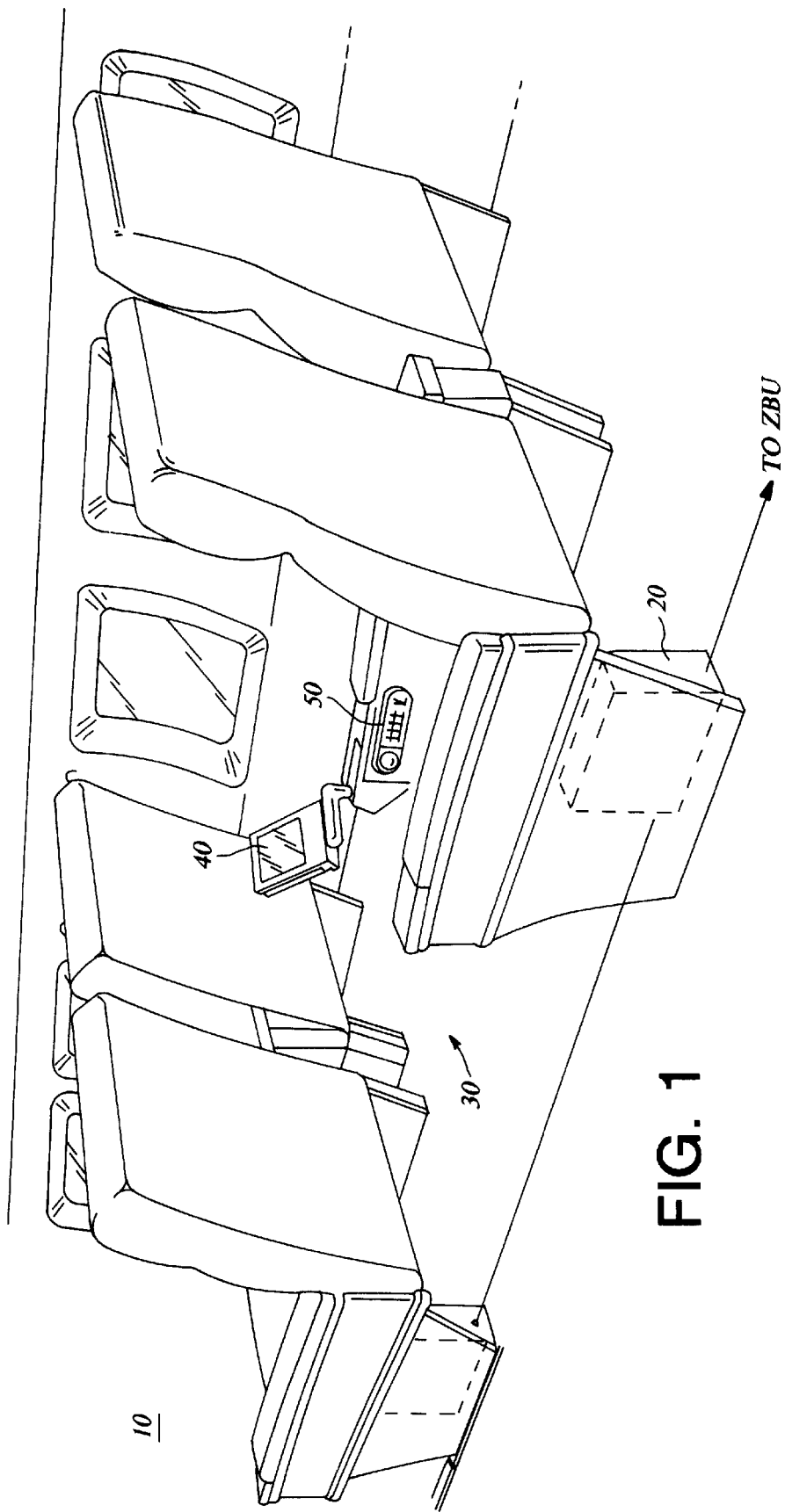
FIG. 1 is an exploded perspective view of a passenger aisle of a commercial aircraft employing an in-flight entertainment ("IFE") system is shown in which passenger seat is provided telephony and in-flight entertainment activities controlled through a seat electronics unit (SEU).

Referring to FIG. 1, a perspective view of a vehicle (e.g., a commercial aircraft) employing an in-flight entertainment ("IFE") system is shown. The IFE system 10 offers on-board telephony as well as in-flight entertainment such as video on demand. "Video on demand" allows individuals to selectively view one of a wide arrays of movies, play a video game, gamble, and engage in other entertainment activities in real-time. To support IFE systems, seat electronics units ("SEUs") have been implemented to control the propagation of information, including video and audio to support telephony or entertainment services, into certain peripheral devices associated with a group of passenger seats 30. These peripheral devices may include, but are not limited to, video displays 40, including displays being headsets individually worn by passengers, hand-held control unit 50 such as a PCU, and the like.

Figure 2:
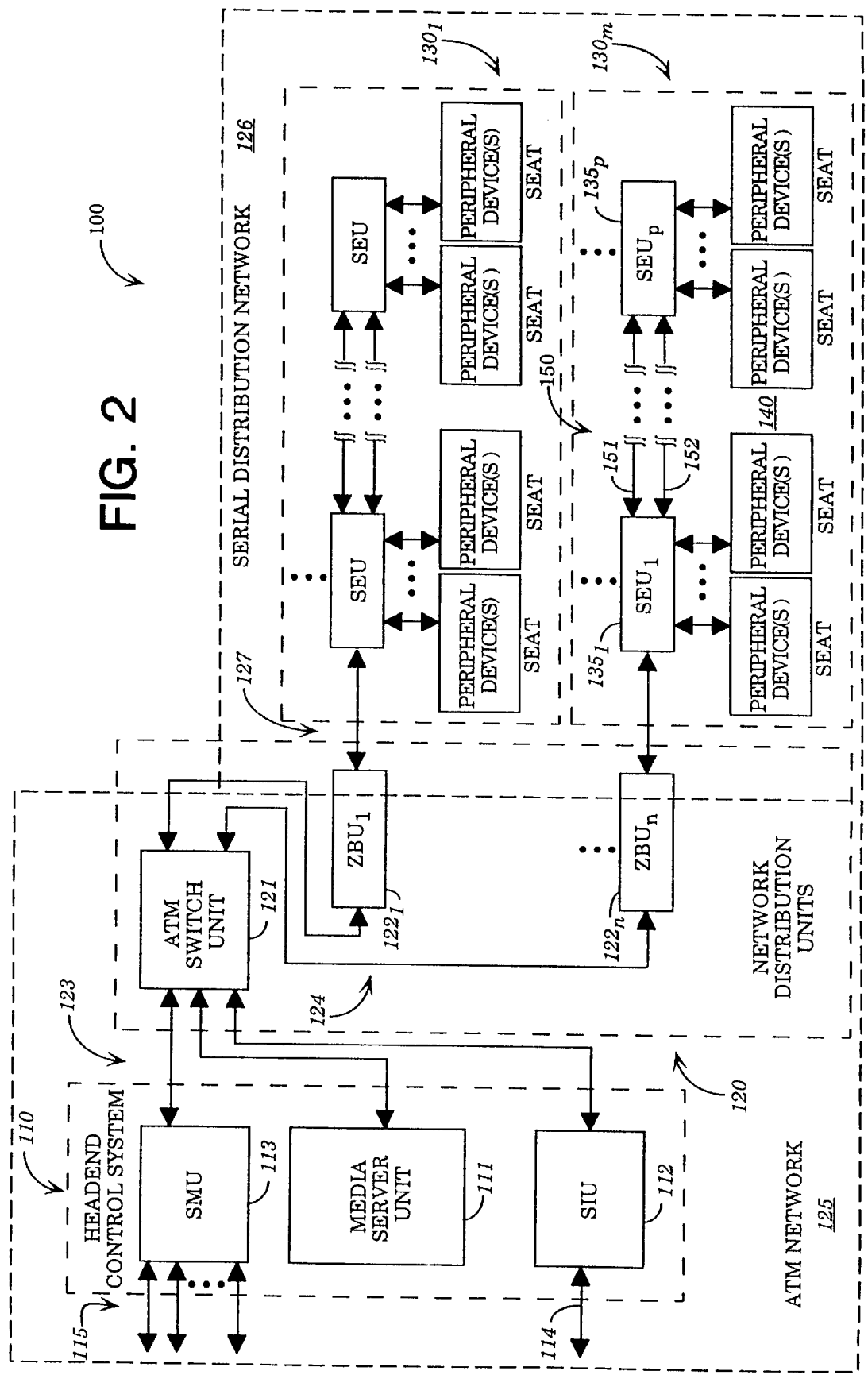
FIG. 2 is a block diagram of the IFE system including a plurality of SEUs implemented within the present invention.

Referring to FIG. 2, a simplified block diagram of an in-flight entertainment ("IFE") system 100 incorporating the present invention is shown. The IFE system 100 includes a headend control system 110, network distribution units 120 and a plurality of groups of SEUs $130_1$–$130_m$ ("m" being a positive whole number). The headend control system 110 is responsible for the storage of data, including video and audio, and for delivery of stored data and/or real-time ("live") data. The network distribution units 120 are responsible for distributing data between the headend units 110 to selected groups of SEUs $130_1$–$130_m$. The data may include, but is not limited to, video, audio, passenger service system ("PSS") data, billing data, game control information, software programs including applets and the like. Each group of SEUs $130_1$–$130_m$ controls at least passenger video display and audio listening capabilities at multiple passenger seats within a selected area of the vehicle.

As shown in FIG. 2, the headend control system 110 includes a media server unit 111, a system interface unit ("SIU") 112, and a system manager unit ("SMU") 113. Preferably, the media server unit 111 (e.g., TIGER™ manufactured by Microsoft Corporation of Redmond, Wash.) provides centralized storage of continuous media, namely video and audio, within a hard disk drive, recordable compact disk players (e.g., digital video disks) and the like. The media server unit 111 further provides for the distribution of continuous media scheduled at a constant bit rate at isochronous intervals. The SIU 112 provides, among other things, a secondary data path for video and audio data through analog communication lines 114 from which that data is converted into a digital format before transmission through the IFE system 100.

The SMU 113 operates as a computer, having a number of peripheral interfaces 115, to control appropriate delivery of data throughout the vehicle such as a commercial aircraft. This data may be formatted within the SMU 113 in accordance with a number of electrical standards and protocols, including but not limited to "OC-3" fiber for distribution through digital links 123 (described below), but also RS-485 standard and Aeronautical Radio, Inc. ("ARINC") 429 protocol. This standard and protocol are set forth in publications such as "EIA Standard for Electrical Characteristics of Generators and Receivers for use in Balanced Digital Multipoint Systems, RS-485" Electronic Industries Association, Washington, D.C. (April 1983) and "Mark 33 Digital Information Transfer System" (DITS) Part 1 Functional Description, Electrical Interface, Label Assignments and Word Formats, ARINC Specification 429P1-15" Aeronautical Radio, Inc., Annapolis, Md. (Sep. 1, 1995).

The network distribution units 120 include an Asynchronous Transfer Mode ("ATM") switch unit 121, and a plurality of zone bridge units ("ZBUs") $122_1$–$122_n$ ("n" is a positive whole number). The ATM switch unit 121 functions as the central switching mechanism of the IFE system 100 by routing data received from the headend control system 110 via digital communication links 123 (e.g., digital fiber optics) into the ZBUs $122_1$–$122_n$ through digital communication links 124. The ZBUs $122_1$–$122_n$ operate as a bridge for transferring data between an ATM network 125, preferably based on fiber optic technology, to a serial distribution network 126 propagating video and audio data through digital serial communication buses 127 in compliance with preferably at least IEEE 1394 electrical standards. Each ZBU (e.g., ZBU $122_n$) is assigned responsibility in controlling the propagation of data between the headend control system 110 and a unique group of "p" SEUs $135_1$–$135_p$ ("p" is a positive whole number within a particular area of the vehicle. For clarity sake, the discussion will focus on the interworkings of one of these SEUs (e.g., SEU $135_1$) during a boot sequence, although all of the SEUs may be configured to operate in an identical manner.

Each of the plurality of SEUs $135_1$–$135_p$ (e.g., SEU $135_1$) includes circuitry used to control the propagation of data to one or more peripheral device(s) 140 (e.g., video displays, PCUs, etc.) in close proximity to its assigned passenger seats. Preferably, as shown SEUs $135_1$–$135_p$ are serially coupled together in a daisy-chain fashion through a digital buses 150 in order to reduce cabling, although other interconnect topologies may be used. The digital buses 150 includes (i) a digital bus 151 preferably transferring information at a transfer rate of 200 megabytes per second ("Mbps") and most preferably in accordance with IEEE 1394 electrical standards, and (ii) a bidirectional digital bus, referred to as "PAT bus" 152, which transfers information between SEUs $135_1$–$135_p$ and their assigned ZBU $122_n$. More specifically, the PAT bus 152 propagates multiplexed audio, PSS data, and telephony information to or from any peripheral device coupled to the SEUs $135_1$–$135_p$ (ranging from 2 to over 50 PCUs) preferably in a chosen protocol and at a data transfer rate of a range of approximately 4–8 Mbps.

Figure 3:
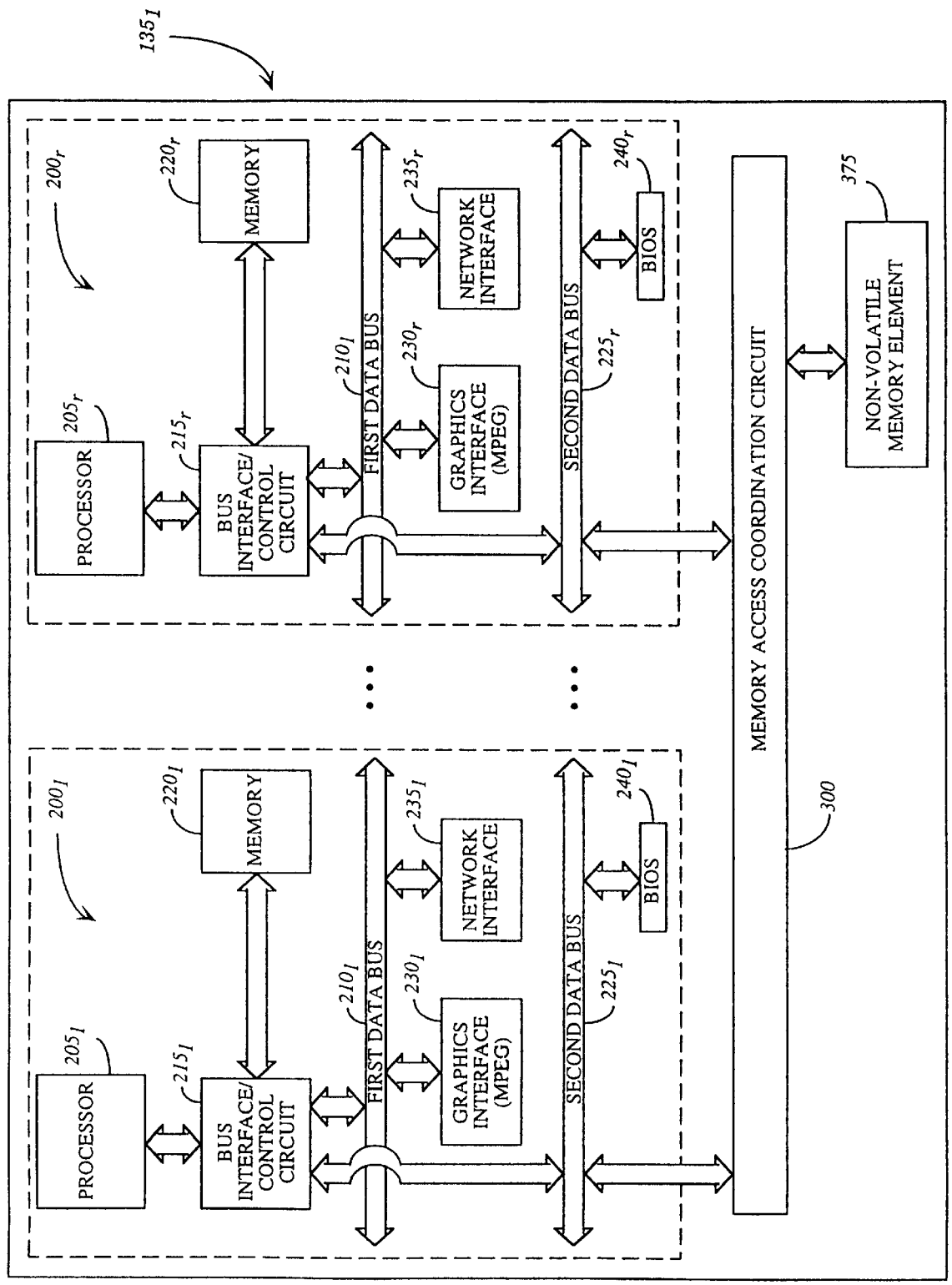
FIG. 3 is a more-detailed block diagram of an SEU employing the present invention.

Referring now to FIG. 3, each of the SEUs $135_1$–$135_p$ includes a plurality of computing systems $200_1$–$200_r$ ("r" being a positive whole number) coupled to a memory access coordination circuit 300. Each of these computing systems $200_1$ . . . , or $200_r$ operates as an independent personal computer to control information transferred between peripheral devices (see FIG. 2) associated with a particular passenger seat and its assigned ZBU. The memory access coordination circuit 300 controls access to the contents of a non-volatile memory element 375 shared by the computing systems $200_1$–$200_r$. The memory element 375 contains at least operational code including, but not limited to operating system code and hardware initialization code necessary, but not critical to, the boot sequence. The selection of the code is based on the operating system utilized. More example, for Windows 95™ and Windows NT™, the memory element 375 may include operational code such as the kernel, registry information of the Windows operating system, device drivers and the like.

As further shown in FIG. 3, each computing system $200_1$ . . . , or $200_r$, describing computing system $200_1$ for example, includes a processor $205_1$ coupled to a first data bus $210_1$ (e.g., a Peripheral Component Interconnect "PCI" bus) through a bus interface/control circuit $215_1$. The bus interface/control circuit $215_1$ is further coupled to (i) local memory $220_1$, which normally is a type of volatile memory (e.g., dynamic random access memory "DRAM") although non-volatile memory could be used, and (ii) a second data bus $225_1$ (e.g., an Industry Standard Architecture "ISA" bus). Although not shown, the bus interface/control circuit $215_1$ includes a direct memory address ("DMA") controller and an interface circuit that enables data to propagate between the processor $205_1$, local memory $220_1$, and those logical elements coupled to the first and second data buses $210_1$ and $225_1$.

As shown, the logical elements coupled to the first and second data buses $210_1$ and $225_1$ include, but are not limited to, a graphics interface $230_1$, a network interface $235_1$ and a BIOS $240_1$. The graphics interface $230_1$ is coupled to the first data bus $210_1$ in order to receive video data and properly converts the video data for display on a peripheral display device corresponding to the computing system $200_1$. The graphics interface $230_1$ may include a decoder circuit (e.g., Motion Picture Expert Group "MPEG" decoder) to decode data from its encoded format during transmission through the digital bus. The network interface $235_1$ provides an interconnection between the first data bus $210_1$ and the digital bus, preferably including both the IEEE 1394 digital bus and the PAT bus. The BIOS $240_1$ provides code critical for hardware initialization and operations of the computing system, although the amount of code may be minimized in favor of placing less critical code within the shared, non-volatile memory element 375. Preferably, the critical code includes code associated with the control of the internal clock, text display on the peripheral display device, serial port and other peripheral communications hardware devices, but selection of critical code is a design choice.

The computing systems $200_1$–$200_r$ are collectively coupled to the memory access coordination circuit 300. The memory access coordination circuit 300 determines which processor $205_1$, . . . or $205_r$ of the computing systems $200_1$–$200_r$ has access to the non-volatile memory element 350 at any given time. Since more than one processor may be attempting to perform a DMA transfer at the same time, the memory access coordination circuit 300 is configured to (i) remember which area within the non-volatile memory element 350 each processor $205_1$, . . . or $205_r$ is attempting to access, (ii) to read a particular DMA request, and (iii) to complete a DMA request cycle. The memory access coordination circuit 300 may also be configured with an ability to control the rate of the DMA transfer to take advantage of priority DMA handling, if utilized, by loading appropriate information in DMA control registers herein. The details of this functionality are described in FIGS. 4–8.

Figure 4:
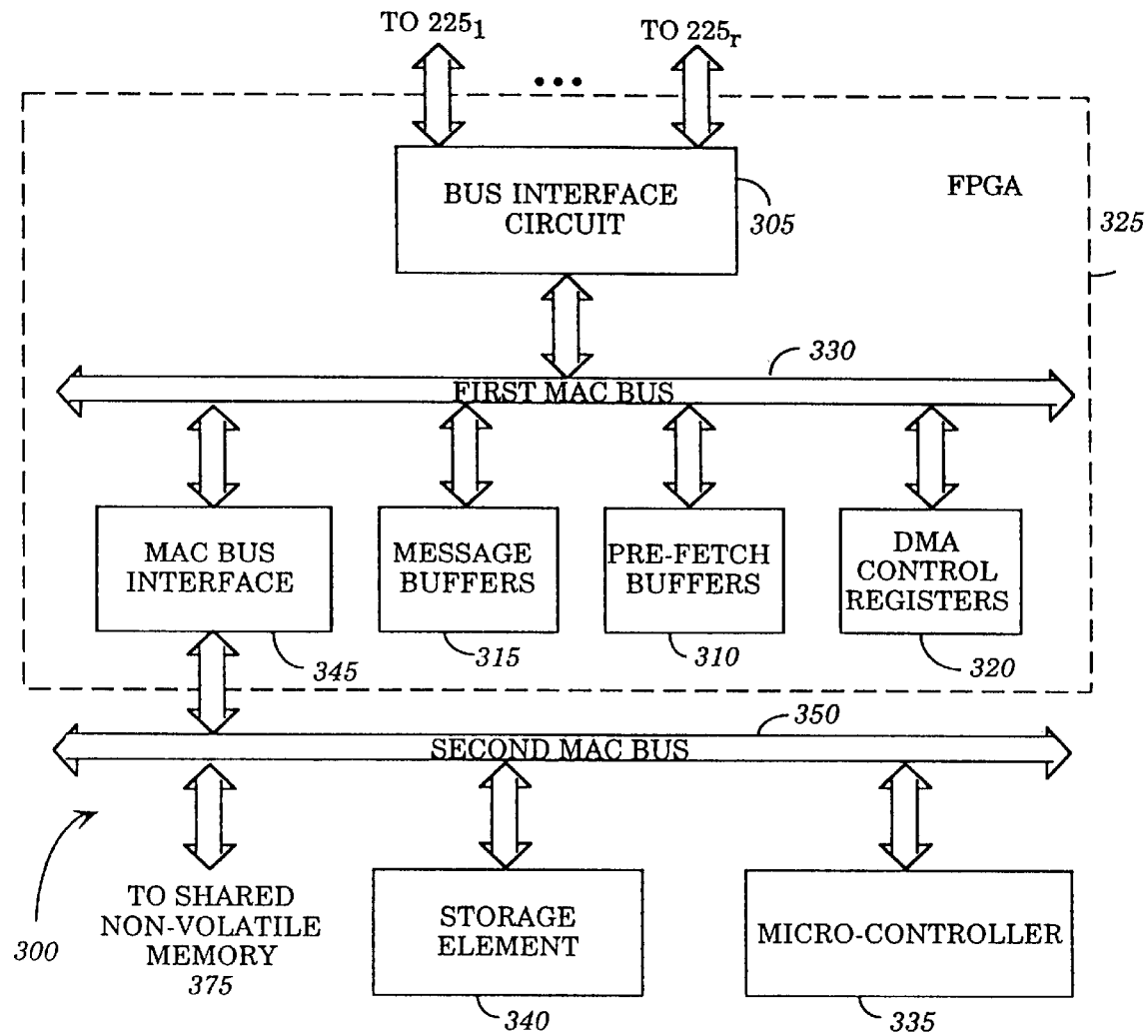
FIG. 4 is a block diagram of a first embodiment of the memory access coordination circuit of the SEU used to control DMA transfers between a shared, non-volatile memory element and local memory of a selected processor during a boot sequence.

Referring now to FIG. 4, a first embodiment of the memory access coordination circuit 300 of a SEU (e.g., SEU $135_1$) is shown. The memory access coordination circuit 300 includes a bus interface circuit 305 coupled to a plurality of storage elements, including pre-fetch buffers 310, message buffers 315 and DMA control registers 320. To optimize performance and reduce pin count, these logic elements 305–320 may be collectively implemented as an Application Specific Integrated Circuit such as a Field Programmable Gate Array ("FPGA") 325.

As shown, the bus interface circuit 305 is implemented as an ISA bus interface if an ISA bus is used as the second data bus. The bus interface circuit 305 includes not only input/output ("I/O") circuitry that supports DMA accesses, but also multiplex circuitry to allow various data and address information to be selected for transmission to logic elements within the FPGA 325. As a result, the bus interface circuit 305 controls arbitration of the communication path between itself and the non-volatile memory element so that only one of the computing systems can communicate with the non-volatile memory element at a time. The bus interface circuit 305 is coupled to the pre-fetch buffers 310, message buffers 315 and DMA control buffers 320 through a first memory access control ("MAC") bus 330.

The message buffers 315 preferably include a send message buffer and a receive message buffer for each of the computing systems $200_1$–$200_r$. The send message buffer and receive message buffer (not shown) are used to control communications between the processors and logic that sets up the DMA transfer. The prefetch buffers 310 are used to reduce DMA loading of a second MAC bus 350 by supporting data bursts, which reduce the amount of overhead cycle time normally required for local bus arbitration. Thus, pre-fetch buffers 310 further increase ISA bus efficiency because ISA read and write cycles may be completed with fewer wait states and arbitration of the second MAC address is not necessary. The DMA control registers 320 are used to contain parameters need to perform a DMA transfer. These parameters may include, but are not limited to, rate control, a count which may be used to verify that receipt of a Terminal Count control signal (described below) is accurate, DMA enable bit, and address information to assist in loading data from the shared, non-volatile memory element to the pre-fetch buffers 305.

In this embodiment, the memory access coordination circuit 300 further includes a micro-controller 335 which enables the FPGA 325 to perform a DMA transfer, and a storage element 340. The storage element 340 includes non-volatile memory to contain code executed by the micro-controller 335 to perform set-up before the DMA transfer as well as management information about the seat configuration of the vehicle. It is contemplated that seat configuration may be static in nature of dynamically alterable. The micro-controller 335 and storage element 340 are coupled together through the second MAC bus 350, which in turn, is coupled to the first MAC bus 330 through a MAC bus interface circuit 345.

Figure 5:
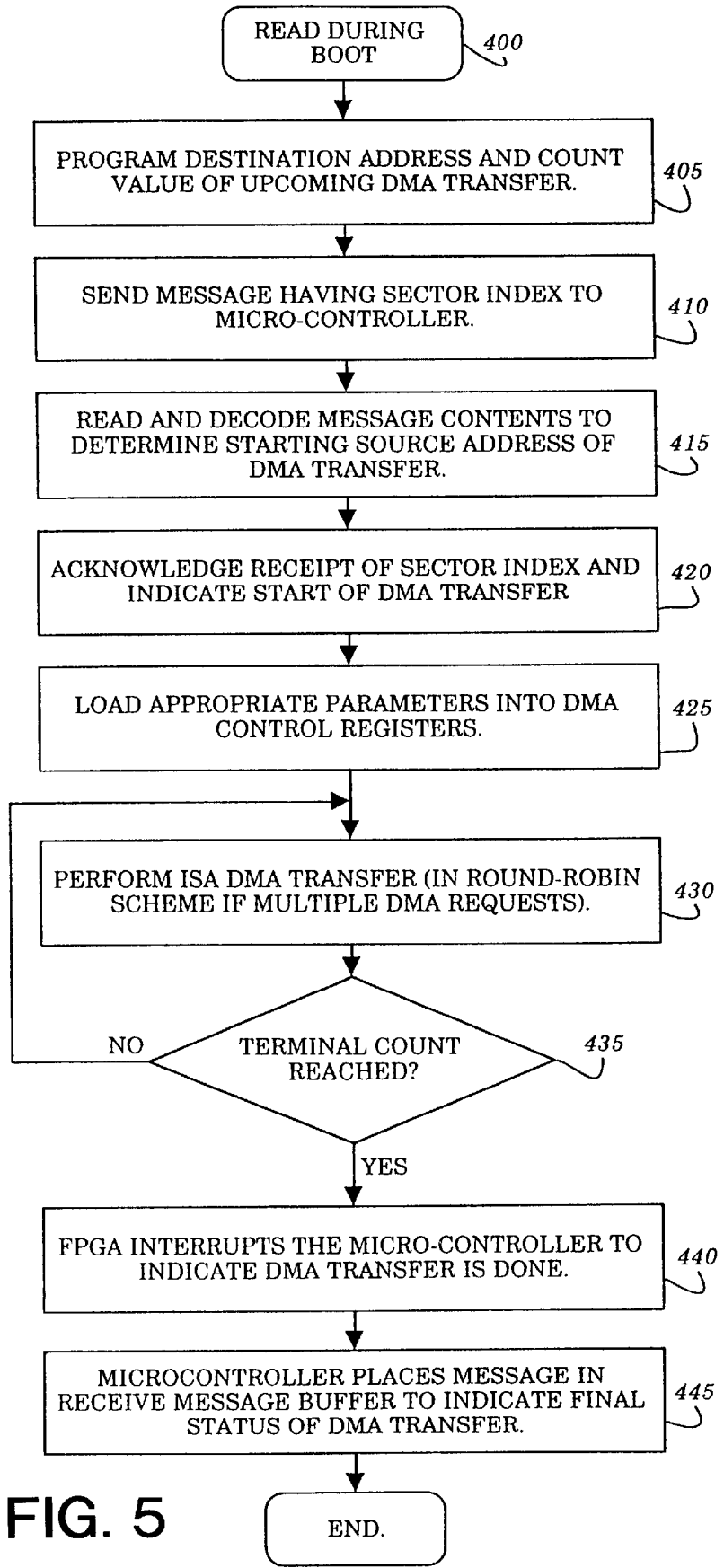
FIG. 5 is a flowchart illustrating a DMA transfer scheme used by the memory access data coordination circuit of FIG. 4 to read operational code from the shared, non-volatile memory element.

As shown in FIG. 5, a DMA transfer scheme used by the memory access coordination circuit to read operational code from the non-volatile memory element of FIG. 4 is shown. During a boot sequence resulting from a boot condition (e.g., a power up, reset, etc.), if a processor (e.g., processor $205_1$ of FIG. 3) needs access to the contents of the non-volatile memory element (Step 400), the processor initially programs the local DMA controller, implemented within the bus interface/control circuit, with the destination address and count value associated with an upcoming DMA transfer (Step 405). Next, the processor sends a sector index (e.g., a number representing the address from which requested operational code is to be read from the non-volatile memory element) to the micro-controller (Step 410). Preferably, a pre-formatted message having the sector index is written into a send message buffer of the FPGA associated with the computing system employing the processor, and the FPGA interrupts the micro-controller to indicate that the send message buffer is full.

In response, the micro-controller reads and decodes the message contents from the send message buffer and determines the starting source address of the shared, non-volatile memory element to be used in the DMA transfer (Step 415). Such determination is made through one-to-one mapping or one-to-multiple mappings of the sector index to one or more physical addresses of the non-volatile memory element. For shared information, the sector index is mapped to one physical storage location. Otherwise, for data which differs for each seat processor, the sector index can be mapped to multiple, unique physical locations.

Preferably, the micro-controller acknowledges receipt of the sector index and indicates that a DMA transfer is to commence by writing a message into a receive message buffer, corresponding to the send message buffer, to be subsequently read by the processor (Step 420). The micro-controller programs the DMA transfer by loading appropriate parameters in the DMA control registers (Step 425) and the DMA transfer proceeds as a well-known ISA DMA transfer until "Terminal Count" is reached. In other words, the DMA controller preferably decrements the count value and signals the FPGA through an asserted Terminal Count control signal when the count value has reached zero (Steps 430–435).

If only one DMA transfer is being requested, the microcontroller configures the FPGA to service that DMA request. However, if multiple DMA transfers are simultaneously requested for access to the contents of the non-volatile memory element, the micro-controller would preferably configure the FPGA to service the DMA requests according to a Round-Robin arbitration scheme in which each request may be assigned identical priority so that each processor is each processor performed uniformly. Alternatively, DMA requests may be assigned different priorities so that higher priority DMA transfers may be completed before, or at least experience a greater transfer rate than lower priority DMA transfers, although other well-known arbitration schemes may be used.

When the Terminal Count control signal is asserted, the FPGA interrupts the microcontroller to indicate that the DMA transfer is done (Step 440). In response, the microcontroller places a message indicating the final status of the DMA transfer (e.g., completed, error condition, etc.) within the receive message buffer to be subsequently read by the processor (Steps 445).

Figure 6:
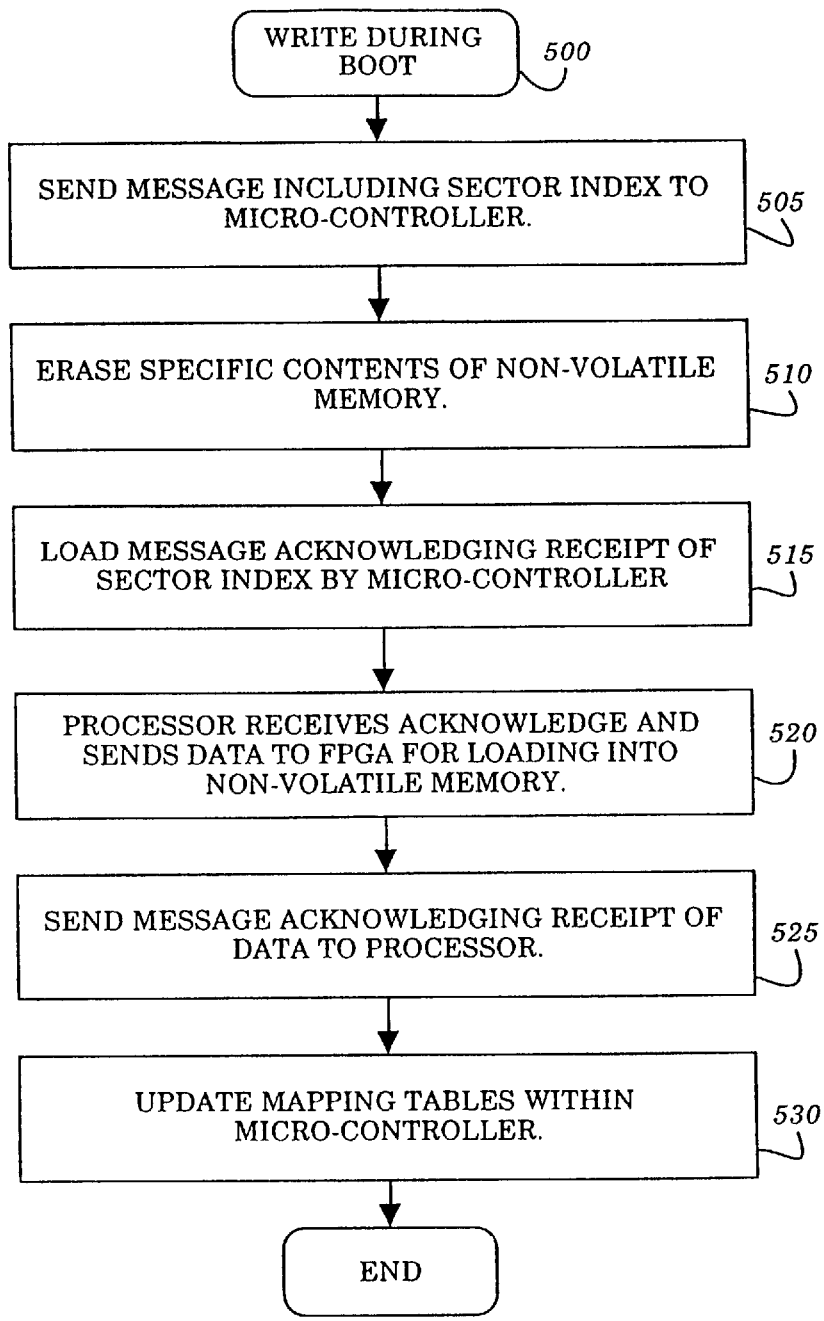
FIG. 6 is a flowchart illustrating the DMA transfer scheme used by the memory access coordination circuit of FIG. 4 to write data into the shared, non-volatile memory element.

Referring now to FIG. 6, a DMA transfer scheme used by the memory access coordination circuit of FIG. 4 to write data into the non-volatile memory element is shown. When necessary to write data into the shared non-volatile memory element, the processor (e.g., processor $205_1$) sends a pre-formatted message having the sector index to be modified by the micro-controller (Step 505). A "sector index" is value representative of a predetermined amount of data (e.g., a block of data such as 512 bytes) contained in the shared non-volatile memory. The sector index is mapped to the starting address of the data within the shared non-volatile memory by the micro-controller accessing its dedicated storage element. It is contemplated, however, that this logical mapping may be replaced with another type of mapping scheme or with a scheme that does not use an address mapping scheme.

In response, specific contents of the shared non-volatile, corresponding to the sector index memory, may be erased, and the micro-controller loads a message acknowledging receipt of the sector index into the receive message buffer (Steps 510–515). Next, the processor reads the receive message buffer and sends a predetermined amount of data (e.g., a block of 512 bytes of data) collectively through successive pre-formatted messages (Step 520). The data is loaded into the non-volatile memory element under the control of the micro-controller.

Thereafter, the microcontroller preferably loads a message acknowledging complete receipt of the data into the receive message buffer and signals the processor to read the receive message buffer (Steps 525). It is contemplated, however, that the micro-controller may load acknowledge messages upon receiving each pre-formatted message of data received by the micro-controller. The micro-controller further updates the index-to-physical address mapping tables used to route the data to the shared non-volatile memory (Step 530).

Figure 7:
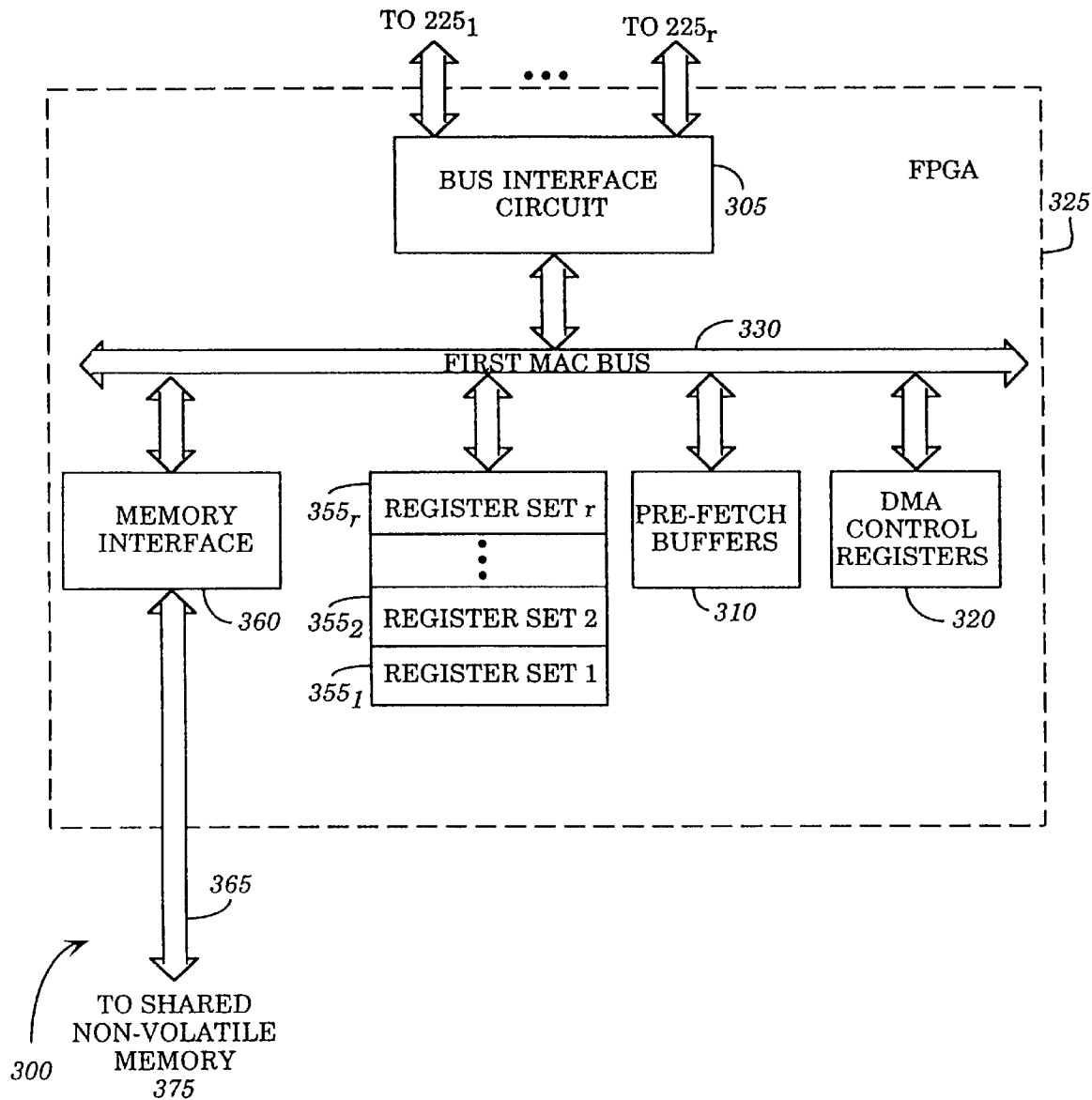
FIG. 7 is a block diagram of a second embodiment of the memory access coordination circuit that arbitrates and controls DMA transfers of operational code from the shared, non-volatile memory element to local memory of the selected processor during a boot sequence.

Referring now to FIG. 7, a second embodiment of the memory access coordination circuit 300 of a SEU $130_1$ is shown. The memory access coordination circuit 300 includes those logic elements identified in FIG. 4 with the exception of the micro-controller, storage element and message buffers. Instead, the FPGA 325 would include a plurality of register sets $355_1$–$355_r$ containing information to fully define the functionality for each DMA transfer without dependence on a micro-controller. Furthermore, the FPGA 325 would include a memory interface 360 to interconnect the first MAC bus 330 to a memory bus 365 coupled to the non-volatile memory element 375. For example, a first register set $355_1$ may include a number of parameters such as a base address of the shared, non-volatile memory, a predetermined byte size of the DMA transfer between non-volatile memory element 375 and the first computing system $200_1$ and the like. This embodiment enables the memory access coordination circuit 300 to emulate a PC Floppy Driver controller or an IDE interface so that previously implemented software drivers may be used.

Figure 8:
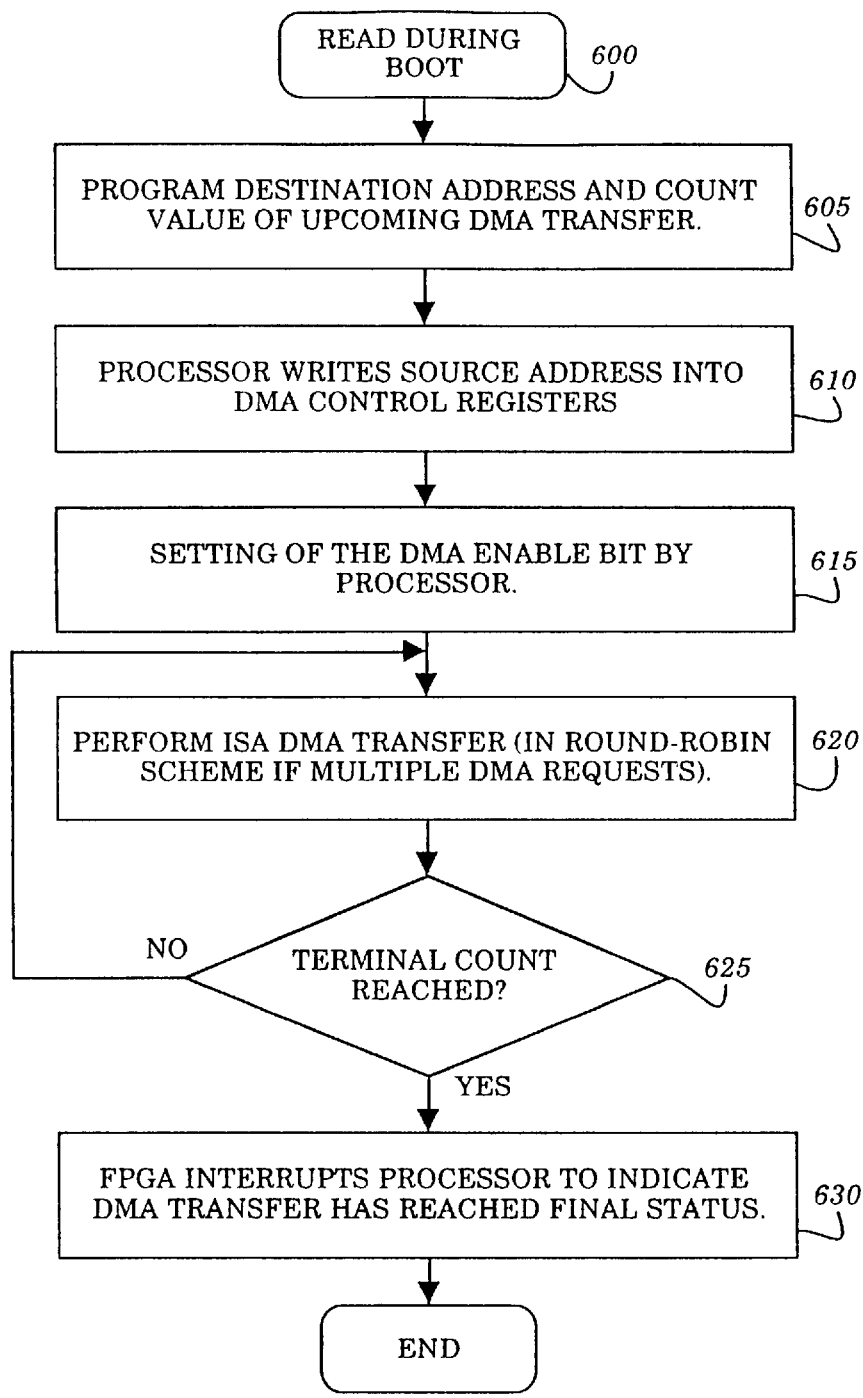
FIG. 8 is a flowchart illustrating a DMA transfer scheme used by the memory access data coordination circuit of FIG. 7 to read operational code from the shared, non-volatile memory element.

As shown in FIG. 8, the DMA transfer mechanism used by the memory access coordination circuit of FIG. 7 to transfer operational code from a shared non-volatile memory element is shown. If a processor (e.g., processor $205_1$ of FIG. 3) needs access to the contents of the non-volatile memory element during the boot procedure (Step 600), the processor programs the local DMA controller, implemented within the bus interface/control circuit, with the destination address and count value associated with the DMA transfer (Step 605). Next, the processor writes a source address (e.g., the address representing a block of data within the non-volatile memory) into the FPGA, namely within DMA control registers (Step 610). The processor sets a bit (e.g., the DMA enable bit) within the DMA control registers of the FPGA to begin the DMA transfer (Step 615). The DMA transfer proceeds as a well-known ISA DMA transfer until Terminal Count is reached (Step 620).

Thereafter, the FPGA determines if the Terminal Count control signal has been asserted by the DMA controller to indicate that the DMA transfer has been completed (Step 625). If so, as shown in Step 630, the FPGA interrupts the processor to indicate that the DMA transfer has been completed or an error condition has resulted.

The present invention described herein may be designed in many different embodiments and using many different configurations. As discussed herein, the architecture of the computing system is flexible, provided there exists control logic which sets up DMA transfers between shared non-volatile memory and the internal memory proximate to the processor. The computing system is preferably employed within any type of vehicle, typically a mass transit vehicle such as an aircraft, train, ferry, bus and the like. While the present invention has been described in terms of various embodiments, other embodiments may come to mind to those skilled in the art without departing from the spirit and scope of the present invention. The invention should, therefore, be measured in terms of the claims which follow.

What is claimed is:

1. A digital entertainment system implemented within a vehicle having at least one peripheral device associated with individual passenger seats within the vehicle, the digital entertainment system comprising:
   a headend control system to transmit information in a first digital format;
   a bridge circuit coupled to said headend control system, said bridge circuit to receive the information in the first digital format, to convert the information into a second digital format, and to output the information in the second digital format; and
   a plurality of seat electronics units coupled to the bridge circuit, each of said plurality of seat electronics units including
      a memory bus,
      a non-volatile memory element coupled to the memory bus, said non-volatile memory element contains operational code used during a boot sequence,
      a plurality of computing systems uniquely controlling operations of at least one peripheral device associated with a passenger seat, each computer system including a processor and a local memory element, to perform the boot sequence in response to a boot condition, and
      a memory access coordination circuit coupled to the memory bus and to each of the plurality of computing systems, said memory access coordination circuit to control arbitration of the memory bus and to control a direct memory access transfer of the operational code from the non-volatile memory element to the local memory element associated with the selected processor.

2. The digital entertainment system according to claim 1, wherein the non-volatile memory element includes flash memory.

3. The digital entertainment system according to claim 1, wherein the memory access coordination circuit includes a micro-controller to control set-up of the direct memory access transfer.

4. The digital entertainment system according to claim 3, wherein the memory access coordination circuit further includes a storage element coupled to the micro-controller, said storage element contains code executed by the micro-controller to set-up the direct memory access transfer.

5. The digital entertainment system according to claim 4, wherein the storage element of the memory access coordination circuit further contains information pertaining to a seat configuration of the vehicle.

6. The digital entertainment system according to claim 3, wherein the memory access coordination circuit further including:
   a first bus;
   a second bus coupled to the micro-controller;
   a first bus interface unit coupled to both the plurality of computing systems and the first bus;
   a plurality of message buffers coupled to the first bus;
   a plurality of pre-fetch buffers coupled to the first bus;
   a plurality of control registers coupled to the first bus; and
   a second bus interface unit coupled to the first bus and the second bus.

7. The digital entertainment system according to claim 6, wherein the plurality of message buffers of the memory access coordination circuit includes a send message buffer and a receive message buffer dedicated to each of the plurality of computing systems, said plurality of message buffers control communications between the selected processor and the micro-controller.

8. The digital entertainment system according to claim 7, wherein the plurality of pre-fetch buffers of the memory access coordination circuit are used to reduce loading on the second bus by supporting data bursts during the direct memory access transfer.

9. The digital entertainment system according to claim 8, wherein the plurality of control registers of the memory access coordination circuit are used to contain parameters needed to perform the direct memory access transfer.

10. The digital entertainment system according to claim 1, wherein the memory access coordination circuit includes:
    a first bus;
    a first bus interface unit coupled to both the plurality of computing systems and the first bus;
    a plurality of pre-fetch buffers coupled to the first bus;
    a plurality of control registers coupled to the first bus; and
    a plurality of register sets coupled to the first bus, each of the register sets uniquely corresponding to one of the plurality of computing systems and including information needed by the plurality of control registers to set up the direct memory access transfer.

11. A circuit that controls propagation of data to at least one peripheral device placed within a vehicle, the circuit comprising:
    a memory bus;
    a non-volatile memory element coupled to the memory bus, said non-volatile memory element to contain operational code used during a boot sequence;
    a plurality of computing systems each including a processor and a local memory element, each of the plurality of computing systems to perform the boot sequence in response to a boot condition; and
    a memory access coordination circuit coupled to the memory bus and to the plurality of computing systems, said memory access coordination circuit to control a direct memory access transfer of the operational code from the non-volatile memory element to the local memory element associated with a selected processor of one of the computer systems.

12. The circuit according to claim 11, wherein the memory access coordination circuit further controlling arbitration of the memory bus during the boot sequence to award ownership to the selected processor.

13. The circuit according to claim 11, wherein the non-volatile memory element includes flash memory.

14. The circuit according to claim 12, wherein the memory access coordination circuit includes a micro-controller to control set-up of the direct memory access transfer.

15. The circuit according to claim 14, wherein the memory access coordination circuit further includes a storage element coupled to the micro-controller, said storage element contains code executed by the micro-controller to set-up the direct memory access transfer.

16. The circuit according to claim 15, wherein the storage element of the memory access coordination circuit further contains information pertaining to a seat configuration of the vehicle.

17. The circuit according to claim 14, wherein the memory access coordination circuit further including:
    a first bus;
    a second bus coupled to the micro-controller;

a first bus interface unit coupled to both the plurality of computing systems and the first bus;

a plurality of message buffers coupled to the first bus;

a plurality of pre-fetch buffers coupled to the first bus;

a plurality of control registers coupled to the first bus; and a second bus interface unit coupled to the first bus and the second bus.

18. The circuit according to claim 17, wherein the plurality of message buffers of the memory access coordination circuit includes a send message buffer and a receive message buffer dedicated to each of the plurality of computing systems, said plurality of message buffers control communications between the selected processor and the microcontroller.

19. The circuit according to claim 18, wherein the plurality of pre-fetch buffers of the memory access coordination circuit are used to reduce loading on the second bus by supporting data bursts during the direct memory access transfer.

20. The circuit according to claim 19, wherein the plurality of control registers of the memory access coordination circuit are used to contain parameters needed to perform the direct memory access transfer.

21. The circuit according to claim 11, wherein the memory access coordination circuit includes:

a first bus;

a first bus interface unit coupled to both the plurality of computing systems and the first bus;

a plurality of pre-fetch buffers coupled to the first bus;

a plurality of control registers coupled to the first bus; and a plurality of register sets coupled to the first bus, each of the register sets uniquely corresponding to one of the plurality of computing systems and including information needed by the plurality of control registers to set up the direct memory access transfer.

22. A method for performing a boot sequence by obtaining operational code from a memory element of which its contents are shared by a plurality of processors, the method comprising the steps of:

determining that a boot condition exists in at least one processor of the plurality of processors;

preparing for a direct memory access transfer from the memory element to a memory local to the at least one processor;

requesting ownership of the memory bus for transferring operational code into the memory local to the at least one processor; and performing the direct memory access transfer of operational code from the memory element into the memory local to the at least one processor.

23. The method of claim 22, wherein the performing step occurs after receiving a grant of ownership of the memory bus.

24. The method of claim 22, wherein the preparing step includes the steps of:

providing a section index to a microcontroller.

25. The method of claim 24, wherein the providing step includes the steps of sending a pre-formatted message into a first buffer, the message includes the section index;

interrupting the micro-controller to indicate the message is in the first buffer; and reading the message by the micro-controller to determine a starting address of the direct memory access transfer.

* * * * *